(12) United States Patent
Huang et al.

(10) Patent No.: US 11,652,277 B2
(45) Date of Patent: May 16, 2023

(54) PORTABLE ELECTRONIC DEVICE

(71) Applicant: Acer Incorporated, New Taipei (TW)

(72) Inventors: Yi-Ta Huang, New Taipei (TW);
Wu-Chen Lee, New Taipei (TW);
Cheng-Nan Ling, New Taipei (TW);
Wen-Chieh Tai, New Taipei (TW)

(73) Assignee: Acer Incorporated, New Taipei (TW)

( * ) Notice: Subject to any disclaimer, the term of this patent is extended or adjusted under 35 U.S.C. 154(b) by 148 days.

(21) Appl. No.: 17/023,390

(22) Filed: Sep. 17, 2020

(65) Prior Publication Data

US 2021/0151857 A1 May 20, 2021

(30) Foreign Application Priority Data

Nov. 19, 2019 (TW) ................................ 108141974

(51) Int. Cl.
*G06F 1/16* (2006.01)
*H01Q 1/24* (2006.01)

(52) U.S. Cl.
CPC ........... *H01Q 1/243* (2013.01); *G06F 1/1616* (2013.01); *G06F 1/1624* (2013.01); *G06F 1/1681* (2013.01)

(58) Field of Classification Search
CPC ...... H01Q 1/243; H01Q 1/084; H01Q 1/2258; G06F 1/1616; G06F 1/1624; G06F 1/1681; G06F 1/1698
See application file for complete search history.

(56) References Cited

U.S. PATENT DOCUMENTS

| | | | | |
|---|---|---|---|---|
| 6,473,296 | B2 * | 10/2002 | Amemiya | G06F 1/1656 361/740 |
| 8,416,561 | B2 * | 4/2013 | Hamada | G06F 1/1681 361/679.28 |
| 9,042,088 | B2 * | 5/2015 | Hamada | G06F 1/1683 312/223.1 |
| 9,107,301 | B2 * | 8/2015 | Pan | G06F 1/1688 |
| 10,642,309 | B2 * | 5/2020 | Cheng | G06F 1/203 |
| 10,831,245 | B1 * | 11/2020 | Miyamoto | G06F 1/1681 |
| 11,221,654 | B2 * | 1/2022 | Chiang | G06F 1/203 |
| 2001/0046116 | A1 * | 11/2001 | Amemiya | G06F 1/1616 361/679.27 |
| 2012/0162951 | A1 * | 6/2012 | Hamada | G06F 1/1681 361/807 |
| 2013/0170124 | A1 * | 7/2013 | Pan | H05K 5/0226 361/679.01 |

(Continued)

*Primary Examiner* — Anthony M Haughton
*Assistant Examiner* — Theron S Milliser
(74) *Attorney, Agent, or Firm* — JCIPRNET

(57) ABSTRACT

A portable electronic device including at least one body, an antenna module, and a rotation mechanism is provided. The antenna module includes an antenna unit, a driving member, and a linking rod. The antenna unit is rotatably disposed on the body, the driving member is slidably disposed on the body and abuts the antenna unit, and a portion of the antenna unit blocks on a sliding path of the driving member, to drive the antenna unit to rotate to open and close relative to the body when the driving member slides. The linking rod has opposite first and second ends. The first end is pivotally connected to the driving member. The rotation mechanism is disposed on the body, the second end is pivotally connected to the rotation mechanism and eccentric to a rotating axis of the rotation mechanism, to slide the driving member when the rotation mechanism rotates.

14 Claims, 13 Drawing Sheets

(56) References Cited

U.S. PATENT DOCUMENTS

| | | | | |
|---|---|---|---|---|
| 2013/0182393 A1* | 7/2013 | Hamada | ............... | G06F 1/1635 |
| | | | | 361/725 |
| 2019/0317552 A1* | 10/2019 | Cheng | ................... | E05D 11/00 |
| 2020/0310498 A1* | 10/2020 | Chiang | ................ | G06F 1/1616 |
| 2020/0371565 A1* | 11/2020 | Miyamoto | ............ | G06F 1/1683 |

\* cited by examiner

PORTABLE ELECTRONIC DEVICE

CROSS-REFERENCE TO RELATED APPLICATION

This application claims the priority benefit of Taiwan application serial no. 108141974, filed on Nov. 19, 2019. The entirety of the above-mentioned patent application is hereby incorporated by reference herein and made a part of this specification.

BACKGROUND

Technical Field

The disclosure relates to a portable electronic device.

Description of Related Art

Since a metal casing has advantages such as high strength, good heat dissipation, and improved design of appearance, after more and more portable electronic devices adopt casings of metal material, the metal environment formed often affects the performance of antenna elements. For example, the coupling effect between the metal casing and the antenna element of the mobile device may form an equivalent capacitance and the equivalent capacitance formed often causes the radiation efficiency of the antenna to be reduced, thereby reducing the wireless communication quality of the mobile device.

In addition, in recent years, the design is becoming lighter, thinner, shorter, and smaller, which also greatly restricts the usable range of the antenna. In order to maintain the radiation efficiency of the antenna, existing antenna designs are often required to provide structures such as a break on the external surface of the body, so that the antenna can have a sufficient clearance area for radiation, but such measure damages the aesthetic appearance of the product.

Accordingly, how to balance between the radiation efficiency and the configuration space of the antenna design for a portable electronic device while meeting appearance requirements of the portable electronic device is a topic for persons skilled in the art to consider and solve.

SUMMARY

The disclosure provides a portable electronic device having a movable antenna module, which opens and closes along with a body according to an folded/unfolded state of the body, so that an antenna can have a better usage performance.

The portable electronic device of the disclosure includes at least one body, an antenna module, and a rotation mechanism. The antenna module includes an antenna unit, a driving member, and a first linking rod. The antenna unit is rotatably disposed on the body, the driving member is slidably disposed on the body and abuts the antenna unit, and a portion of the antenna unit blocks on a sliding path of the driving member, such that the driving member drives the antenna unit to rotate to be opened or closed relative to the body when the driving member slides. The first linking rod has a first end and a second end opposite to each other. The first end is pivotally connected to the driving member. The rotation mechanism is disposed on the body. The second end is pivotally connected to the rotation mechanism and eccentric to a rotating axis of the rotation mechanism, so as to slide the driving member when the rotation mechanism rotates.

Based on the above, the portable electronic device allows the driving member and the linking rod of the antenna module to transmit the rotation action of the rotation mechanism to the antenna unit by rotatably disposing the antenna unit on the body together with the rotation mechanism, so that the antenna unit produces an effect of rotating to open and close relative to the body. Accordingly, the movable antenna module may correspondingly change along with the usage state of the portable electronic device, so that the antenna module may move away from the body when being opened relative to the body. Therefore, the antenna module is not restricted even if the body is configured with a metal structure or changed to a thinner design. Relatively, the antenna module may be stored in the body when not in use, so as to keep the appearance thin and tidy.

To make the aforementioned and other features of the disclosure more comprehensible, several embodiments accompanied with drawings are described in detail as follows.

DETAILED DESCRIPTION OF DISCLOSED EMBODIMENTS

Figure 1A:
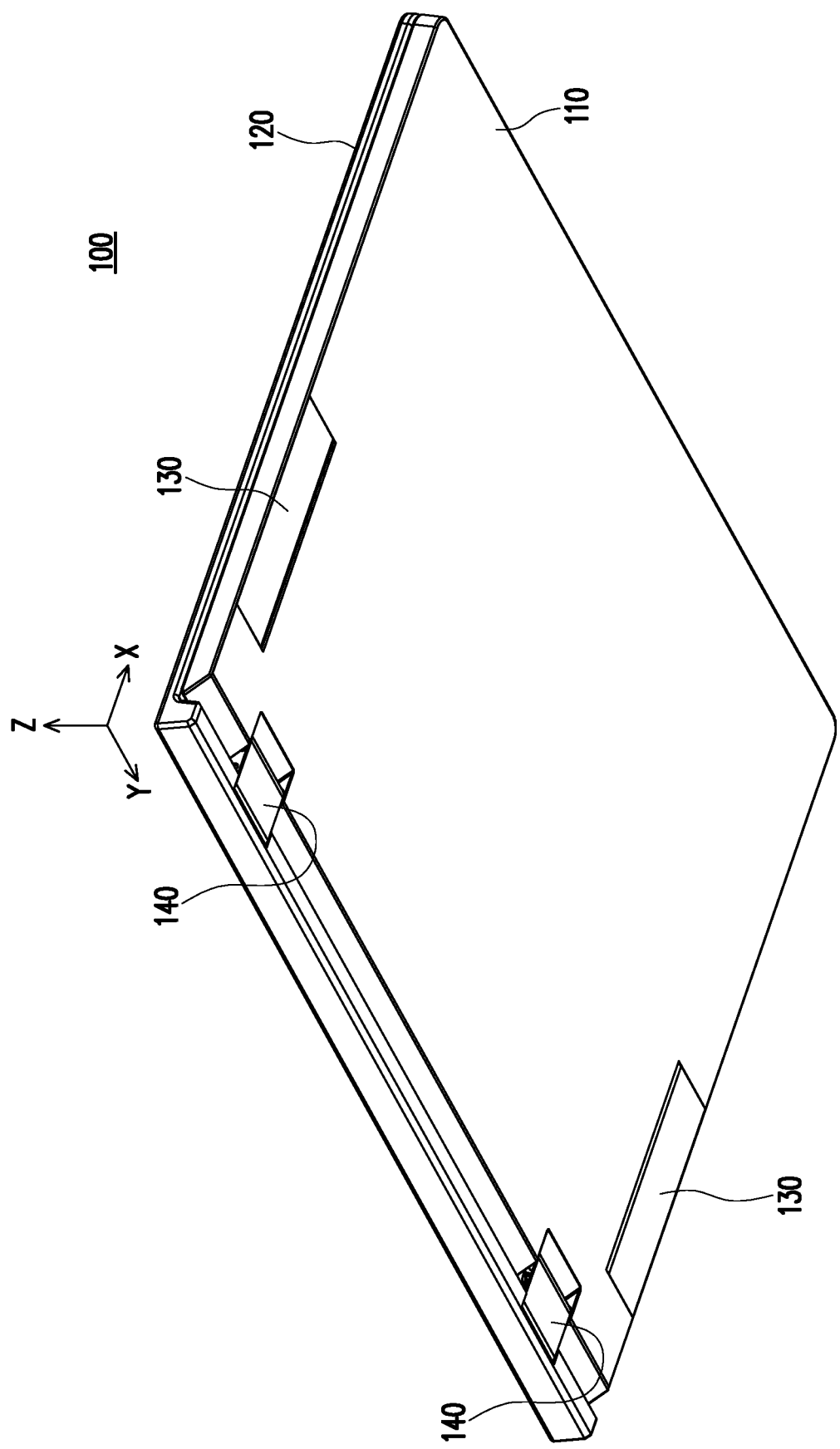
FIG. 1A is a schematic view of a portable electronic device according to an embodiment of the disclosure.
Figure 1B:
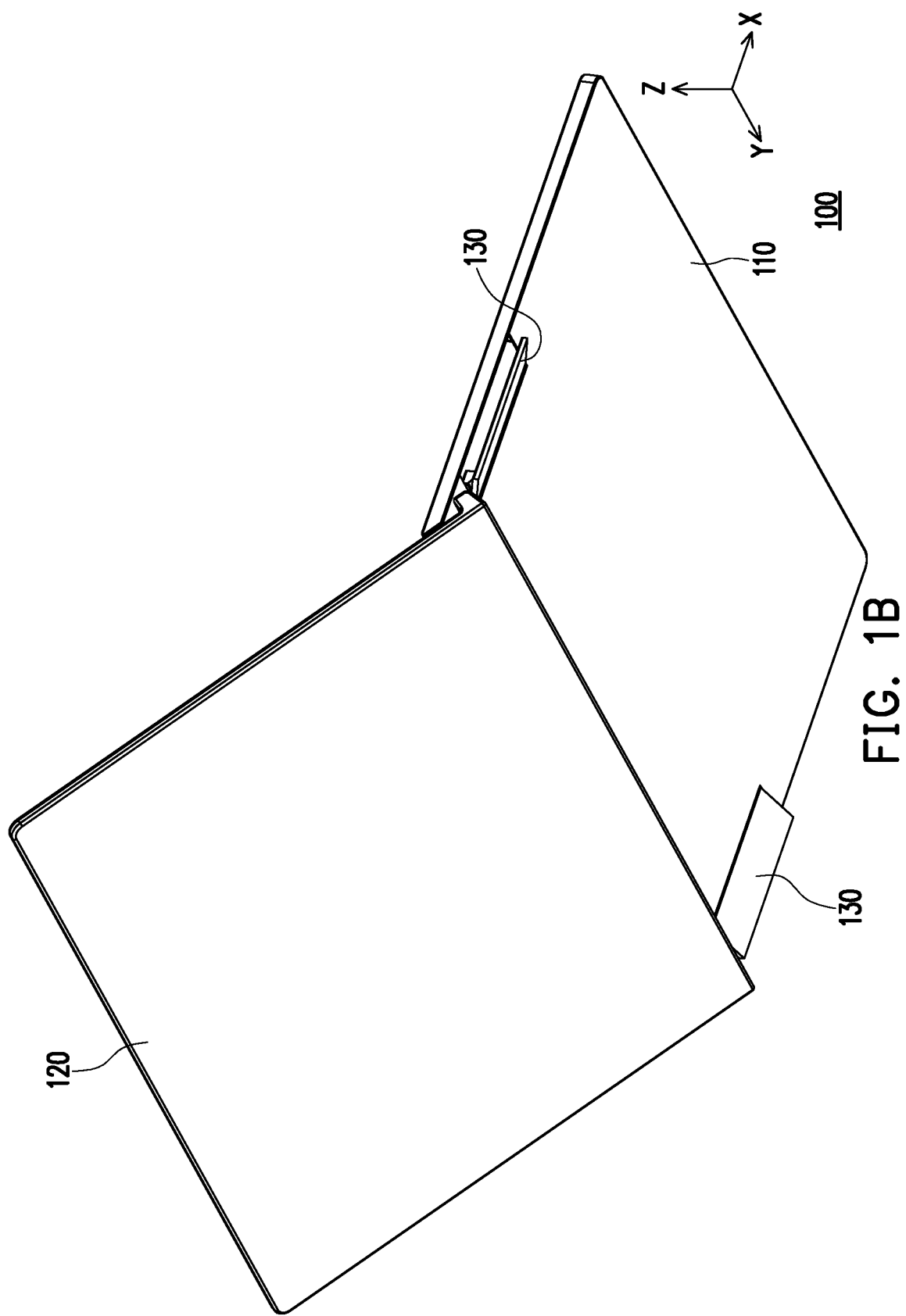
FIG. 1B is a schematic view of the portable electronic device of FIG. 1A in another state.

FIG. 1A is a schematic view of a portable electronic device according to an embodiment of the disclosure. FIG. 1B is a schematic view of the portable electronic device of FIG. 1A in another state. The embodiment simultaneously provides a right-angle coordinate X-Y-Z to facilitate the description of components. Please refer to FIG. 1A and FIG. 1B at the same time. In the embodiment, a portable electronic device 100 is, for example, a notebook computer, but not limited thereto. The portable electronic device 100 includes a first body 110, a second body 120, an antenna module 130, and a rotation mechanism. Here, the rotation mechanism is, for example, a hinge module 140 connected between the first body 110 and the second body 120, with the Y-axis as the rotating axis to allow the first body 110 and the second body 120 to rotatably folded and unfolded relative to each other by the hinge module 140. At the same time, as shown in FIG. 1A and FIG. 1B, the antenna module 130 is rotatably disposed on a bottom surface of the first body 110. When the portable electronic device 100 is in a closed (folded) state as shown in FIG. 1A, the antenna module 130 is substantially hidden in the bottom surface of the first body 110, that is, the antenna module 130 and the bottom surface of the first body 110 have a uniform appearance contour. When the portable electronic device 100 is in an opened (unfolded) state as shown in FIG. 1B, the antenna module 130 is turned inside out to be opened from the bottom surface of the first body 110 and is exposed out of the body 110. In other words, the portable electronic device 100 of the embodiment makes use of the movable antenna module 130 by allowing the antenna module 130 to move away from the first body 110 during operation to effectively improve the radiation efficiency, so as to prevent any radiation from being blocked by disposing the antenna module 130 inside the body as for the case of the metal environment.

Figure 2A:
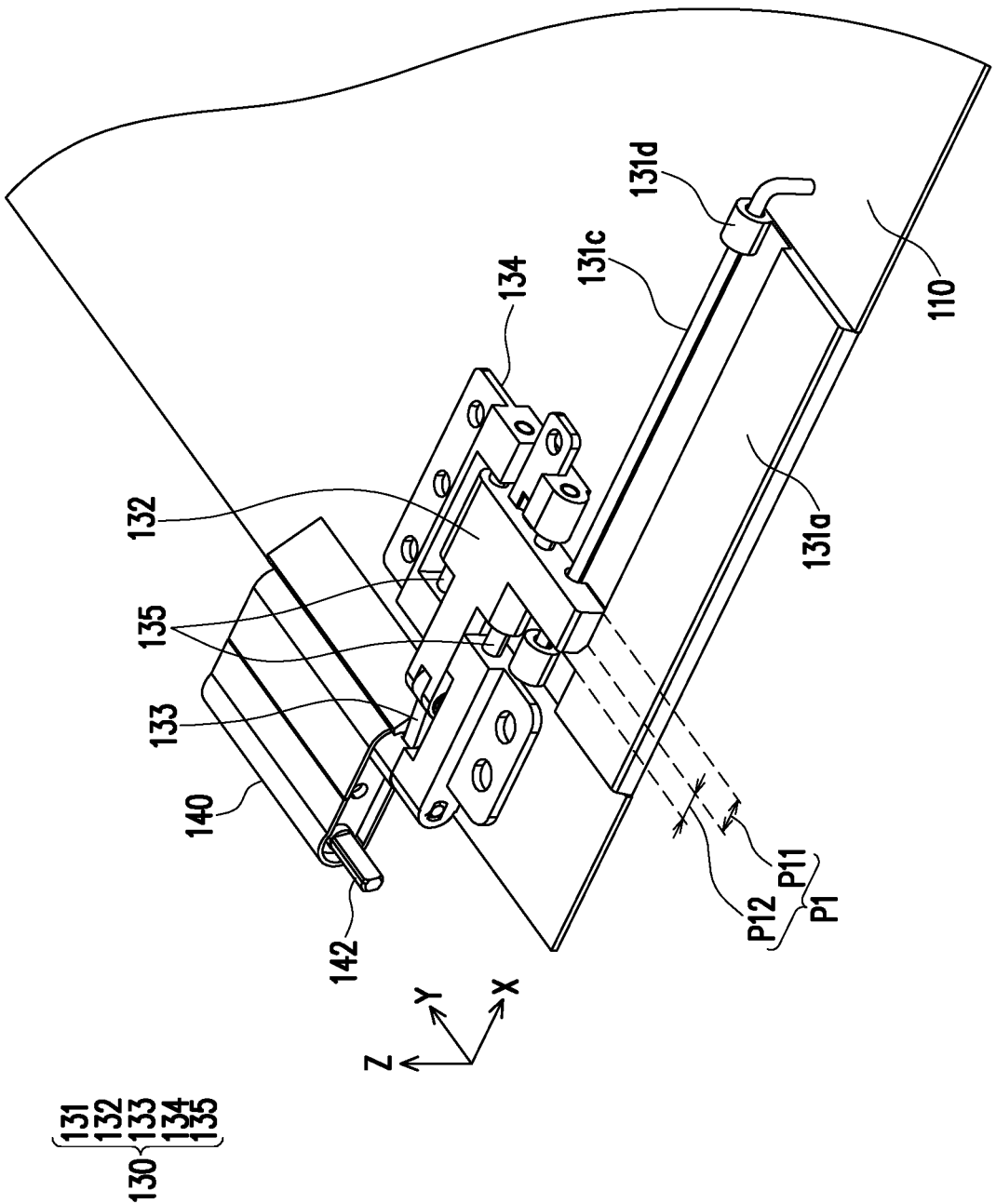
FIG. 2A and FIG. 2B are respectively schematic views of partial components of a portable electronic device in different states.
Figure 2B:
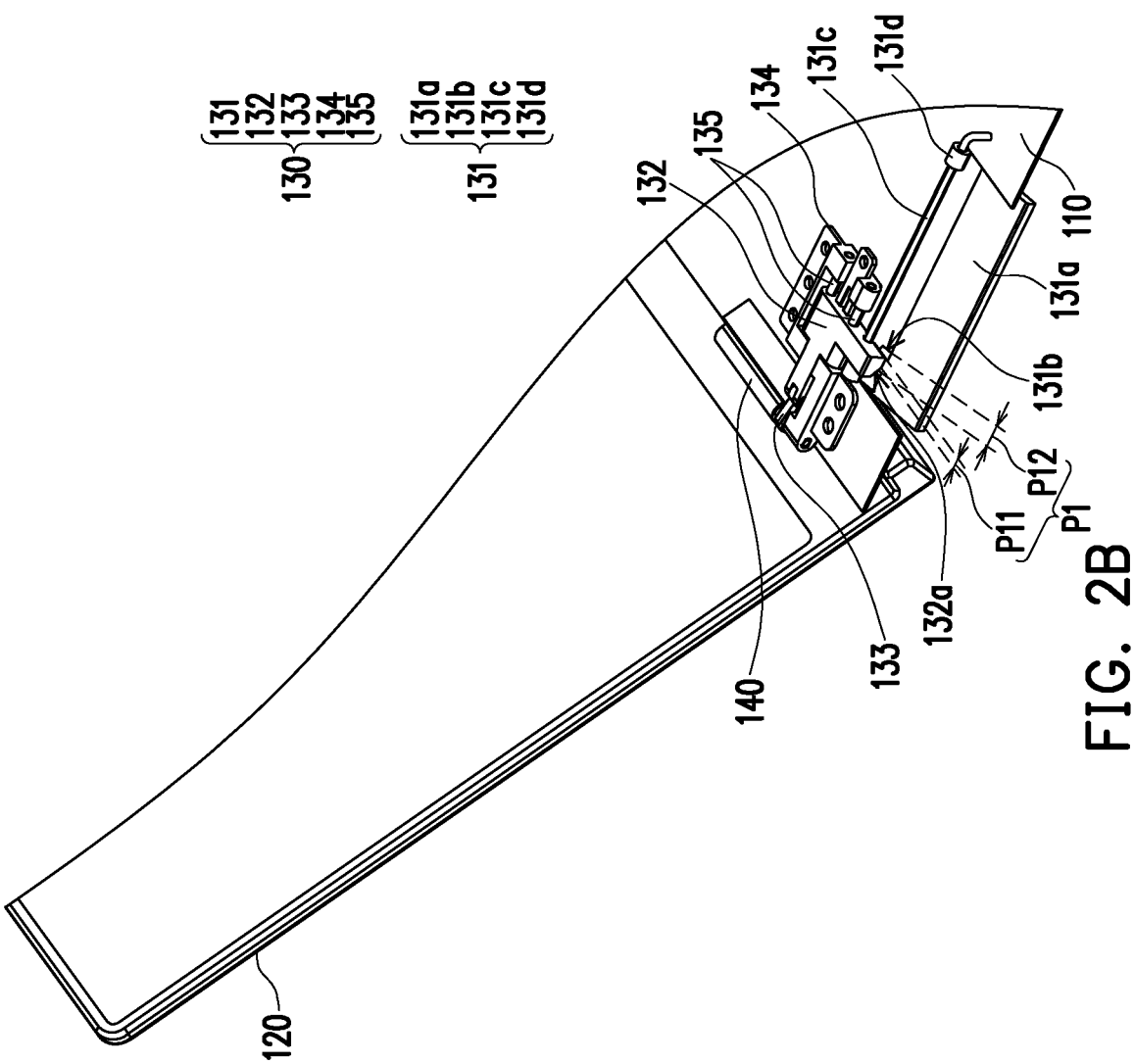
Figure 2C:
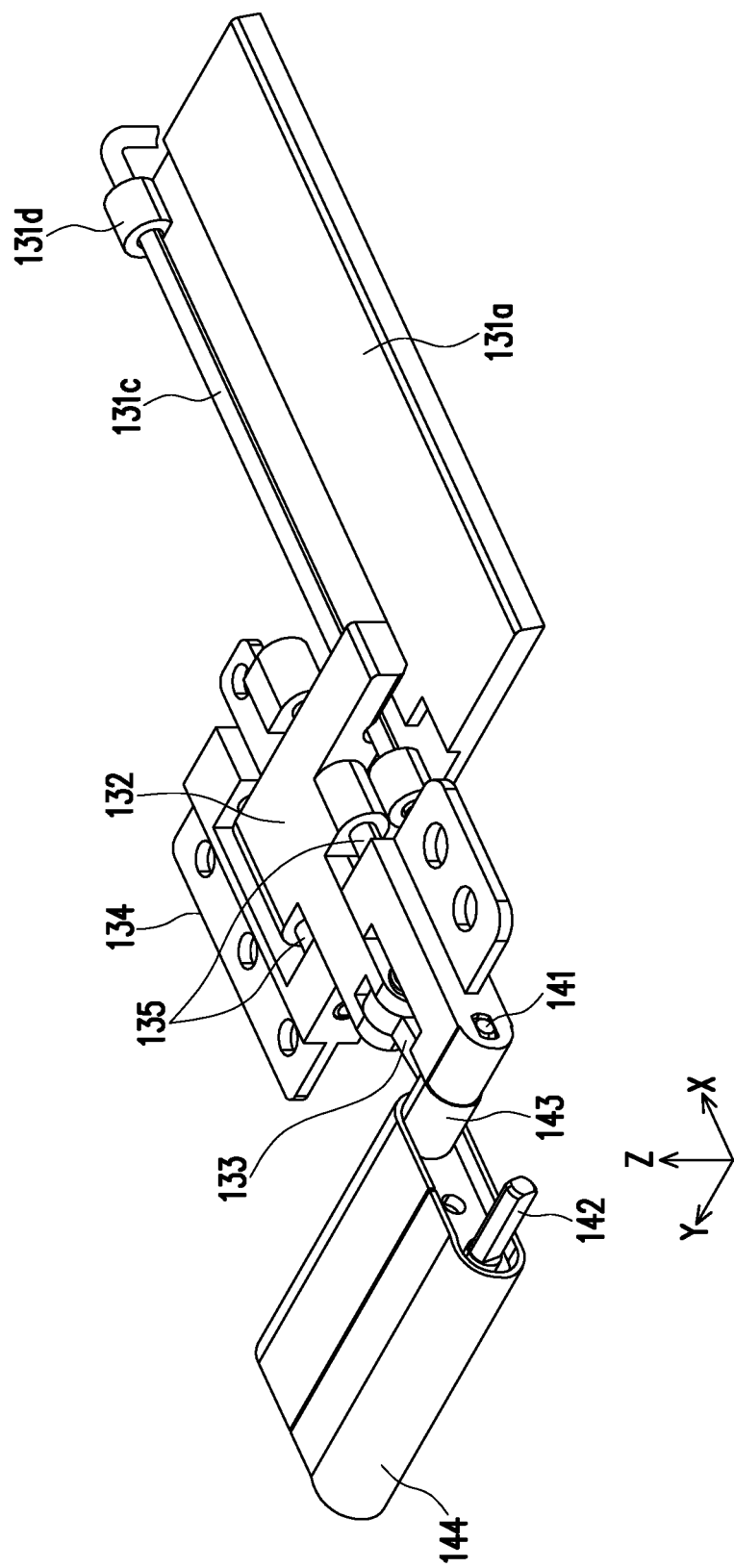
FIG. 2C and FIG. 2D respectively illustrate the components of FIG. 2A and FIG. 2B from another perspective.
Figure 2D:
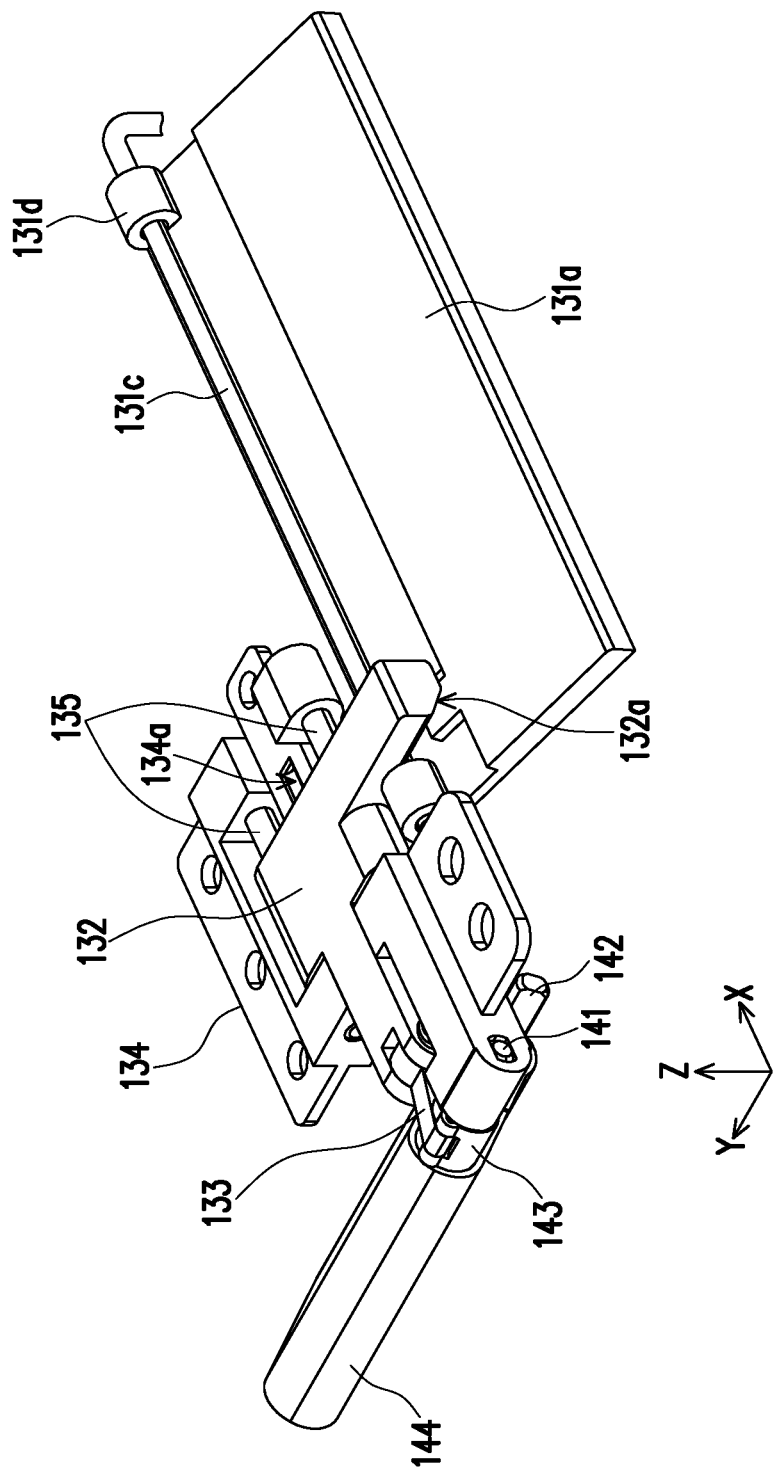
Figure 3A:
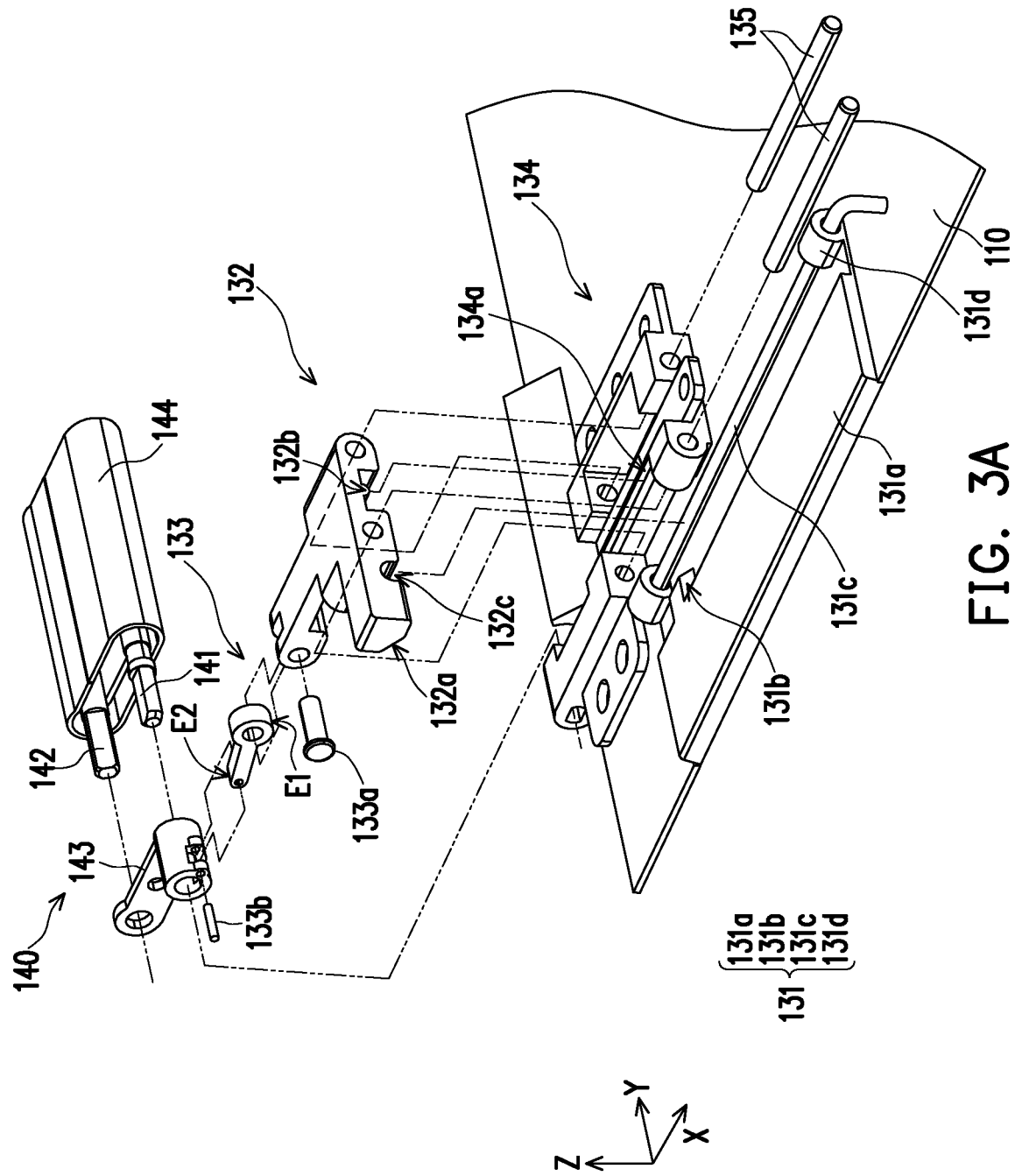
FIG. 3A to FIG. 3C are respectively exploded views of partial components of a portable electronic device.
Figure 3B:
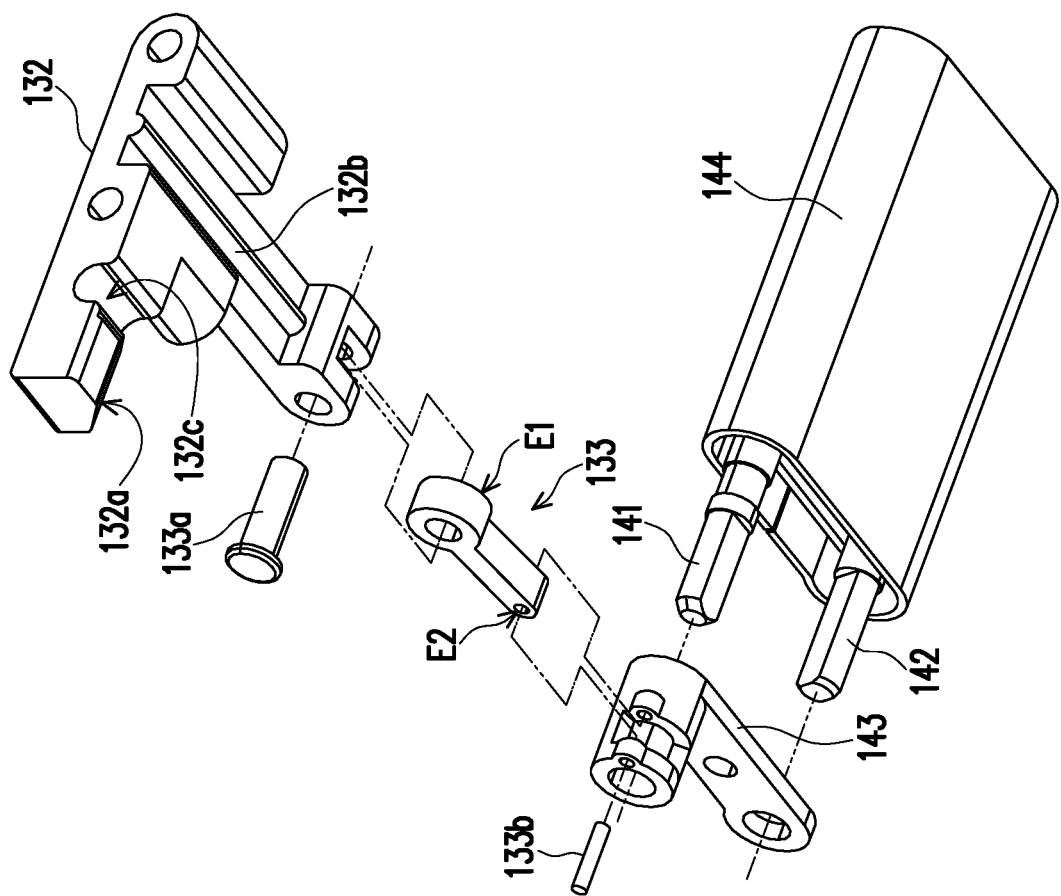
Figure 3C:
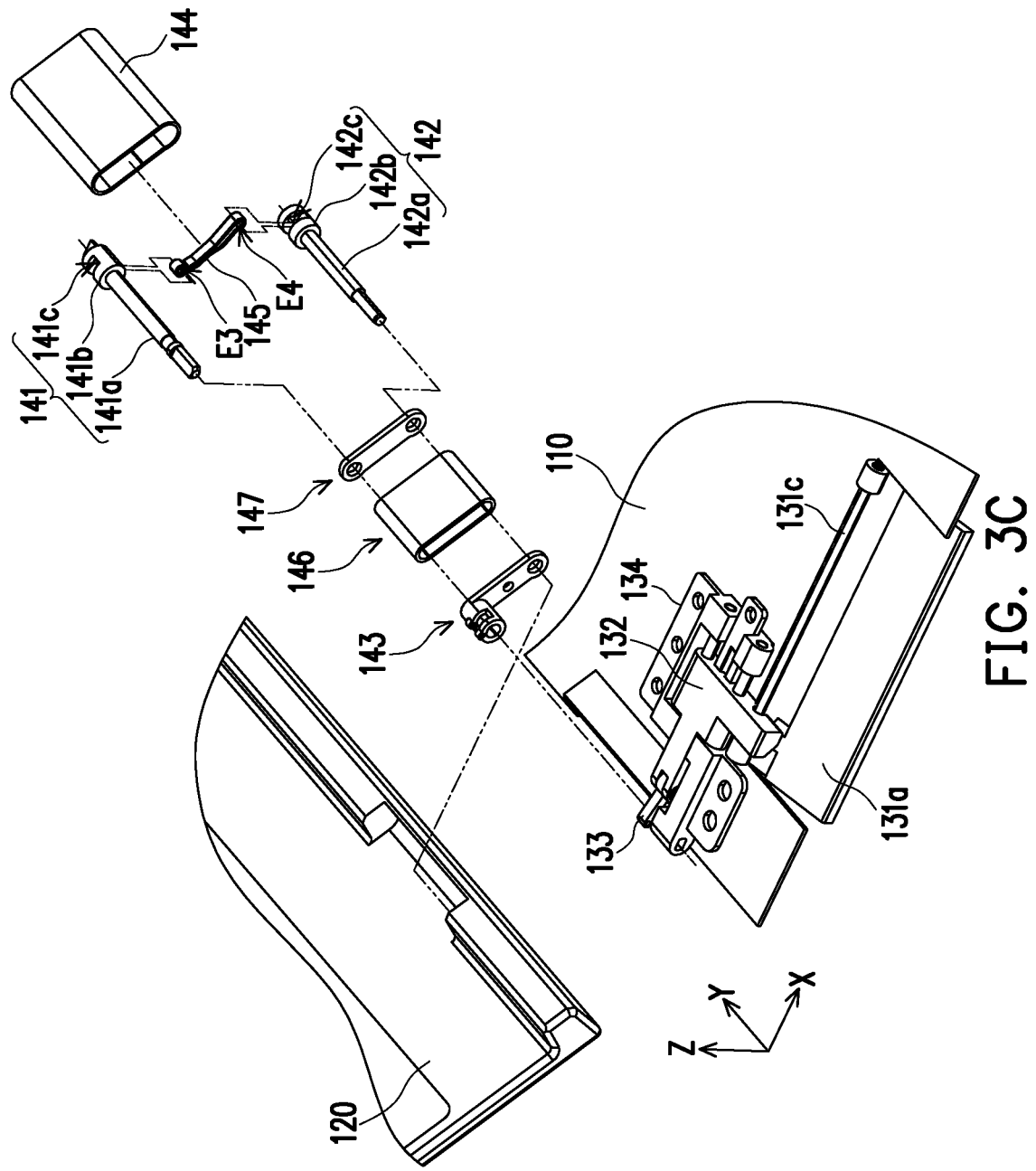

FIG. 2A and FIG. 2B are respectively schematic views of partial components of a portable electronic device in different states. FIG. 2C and FIG. 2D respectively illustrate the components of FIG. 2A and FIG. 2B from another perspective. Here, the first body 110 and the second body 120 are omitted to more clearly identify various components of the antenna module 130. FIG. 3A to FIG. 3C are respectively exploded views of partial components of a portable electronic device. In these drawings, some structures will be omitted to facilitate component identification. For example, a portion of the first body 110 is omitted to facilitate identification of the antenna module 130 therein.

Please refer to FIG. 2A, FIG. 2B, and FIG. 3A first. In the embodiment, the antenna module 130 includes an antenna unit 131, a driving member 132, a first linking rod 133, a base 134, and a guiding rod 135, wherein the base 134 is disposed in the first body 110 and the guiding rod 135 is disposed on the base 134 and passes through the driving member 132. That is, the driving member 132 is restricted by the guiding rod 135 and is movably disposed on the base 134 along the X-axis. In other words, the guiding rod 135 forms a restriction mechanism for restricting the driving member 132 to the X-Y plane and slide only along the X axis. The first linking rod 133 has a first end E1 and a second end E2 opposite to each other, wherein the first end E1 is pivotally connected to the driving component 132 by a component 133a and the second end E2 is pivotally connected to a component 143 of the hinge module 140 by a component 133b.

It should be noted that the hinge module 140 has a first rotating shaft 141 and a second rotating shaft 142, which have rotating axes parallel to the Y-axis. A pivoting axis of the first linking rod 133 pivotally connected to the driving member 132, a pivoting axis of the first linking rod 133 pivotally connected to the component 143 of the hinge module 140, and a rotating axis of the hinge module 140 are parallel to one another. More importantly, the place where the second end E2 of the first linking rod 133 is pivotally connected to the component 143 of the hinge module 140 is substantially eccentric to (the rotating axis of) the first rotating shaft 141. That is, when the first rotating axis 141 is rotated about the Y-axis, the second end E2 is also rotated about the Y-axis but is not concentric with the first rotating shaft 141. Instead, the second end E2 is rotated equivalent to being rotated around the first rotating shaft 141. In this way, it can be known together with the relevant configuration relationship between the first linking rod 133 and the driving member 132 that when the hinge module 140 rotates about the Y-axis, the hinge module 140 drives the driving member 132 to slide along the X-axis by the first linking rod 133. In other words, the rotating axis (Y-axis) of the hinge module 140 is substantially orthogonal to the sliding direction (X-axis) of the driving member 132. Also, the pivoting axes (Y-axes) at the two ends of the first linking rod 133 are parallel to the rotating axis of the hinge module 140.

As shown in FIG. 3A, the antenna unit 131 further includes a shaft 131c disposed along the X-axis in the first body 110. A pivoting portion 131d of the antenna unit 131 is pivotally connected to the shaft 131c. The driving member 132 also has a groove 132c movably coupled to the shaft 131c. At the same time, the base 134 has a groove 134a to correspond to a convex portion 132b of the driving member 132. Accordingly, the guiding rod 135 not only provides the driving member 132 sliding guidance and restriction, but also allows the driving member 132 to smoothly slide back and forth along the X-axis on the base 134 and the shaft 131c in the first body 110, by movably coupling the convex portion 132b to the groove 134a and movably coupling the groove 132c to the shaft 131c.

Moreover, the driving member 132 also has a wedge-shaped convex portion 132a located on the same wing structure of the driving member 132 as the groove 132c. The antenna unit 131 has another wedge-shaped convex portion 131b. The two wedge-shaped convex portions 132a and 131b are on the moving path of each other. Therefore, when the driving member 132 slides on the base 134 with reference to the wedge-shaped convex portion 131b, a wing structure, especially the wedge-shaped convex portion 132a, of the driving member 132 forms a sliding path P1 on the body 131a of the antenna unit 131. The sliding path P1 may be further divided into a second section P12 having the wedge-shaped convex portion 131b and a first section P11 without the wedge-shaped convex portion 131b. Accordingly, when the driving member 132 moves only in the first section P11, the driving member 132 moves only along the surface of the body 131a of the antenna unit 131. At this time, the antenna unit 131 does not have the condition to be driven by the driving member 132, so the antenna unit 131 does not rotate relative to the first body 110 and remains hidden in the first body 110, as shown in FIG. 1A, FIG. 2A, FIG. 2C, and FIG. 3A.

Relatively, when the driving member 132 moves in the second section P12, the wedge-shaped convex portion 131b is regarded as a structure blocking on the sliding path P1. Therefore, by having the two wedge-shaped convex portions 132a and 131b abutting each other, when the driving member 132 is still restricted to slide only along the X-axis, the body 131a of the antenna unit 131 produces a rotating movement relative to the first body 110 due to the abutment between the wedge-shaped convex portions 132a and 131b. In the embodiment, when the driving member 132 moves toward the negative X-axis direction, the body 131a is gradually pushed away and turned inside out of the first body 110 from the bottom surface of the first body 110, as shown in FIG. 1B, FIG. 2B, FIG. 2D, and FIG. 3C. Here, the wedge-shaped guiding surfaces of the two wedge-shaped convex portions 132a and 131b follow the direction of the sliding path P1 of the driving member 132, so that the driving member 132 may smoothly slide back and forth along the X-axis. In another unillustrated embodiment, a torsion spring may disposed between the shaft 131c and the pivoting portion 131d to facilitate a restoring action of the antenna unit 131 to be closed relative to the first body 110.

Based on the above, in terms of the driving member 132 and the sliding process of the driving member 132 on the base 134, a portion (i.e. the wedge-shaped convex portion 131b) of the antenna unit 131 blocks on the sliding path P1 of the driving member 132, so as to compose the main mechanism for the driving member 132 to drive the antenna unit 131 to rotate to open and close relative to the first body 110. Furthermore, by the connection relationship of the hinge module 140 and the antenna module 130, the rotating movement produced by the hinge module 140 may cause the sliding movement of the driving member 132 and cause the antenna unit 131 to switch between whether to rotate, so that the antenna module 130 of the portable electronic device 100 may open and close relative to the bottom surface of the first body 110 along with the folding or unfolding of the first body 110 and the second body 120, as shown in FIG. 1A and FIG. 1B. Therefore, the antenna module 130 may have a better radiation efficiency by moving away from the first body 110 and the second body 120 when activated.

In the embodiment, the hinge module 140 is, for example, a rotation mechanism of a double-shaft. In addition to providing the driving force for the antenna module 130 to rotate to be folded or unfolded, the hinge module 140 further provides the relative movement of the first body 110 and the second body 120 during the process of folding or unfolding. Please refer to FIG. 3C. The hinge module 140 further includes a second linking rod 145, torque components 144, 146, and 147, and the component 143. The first rotating shaft 141 and the second rotating shaft 142 are disposed parallel to each other along the Y-axis and pass through the torque components 144, 146, and 147, and the component 143. The first rotating shaft 141 is connected to the first body 110 and the second rotating shaft 142 is connected to the second body 120. The second linking rod 145 has a third end E3 and a fourth end E4 opposite to each other. The third end E3 is pivotally connected to the first rotating shaft 141 and is eccentric to the rotating axis (Y-axis) of the first rotating shaft 141. The fourth end E4 is pivotally connected to the second rotating shaft 142 and is eccentric to the rotating axis (Y-axis) of the second shaft 142.

Figure 4A:
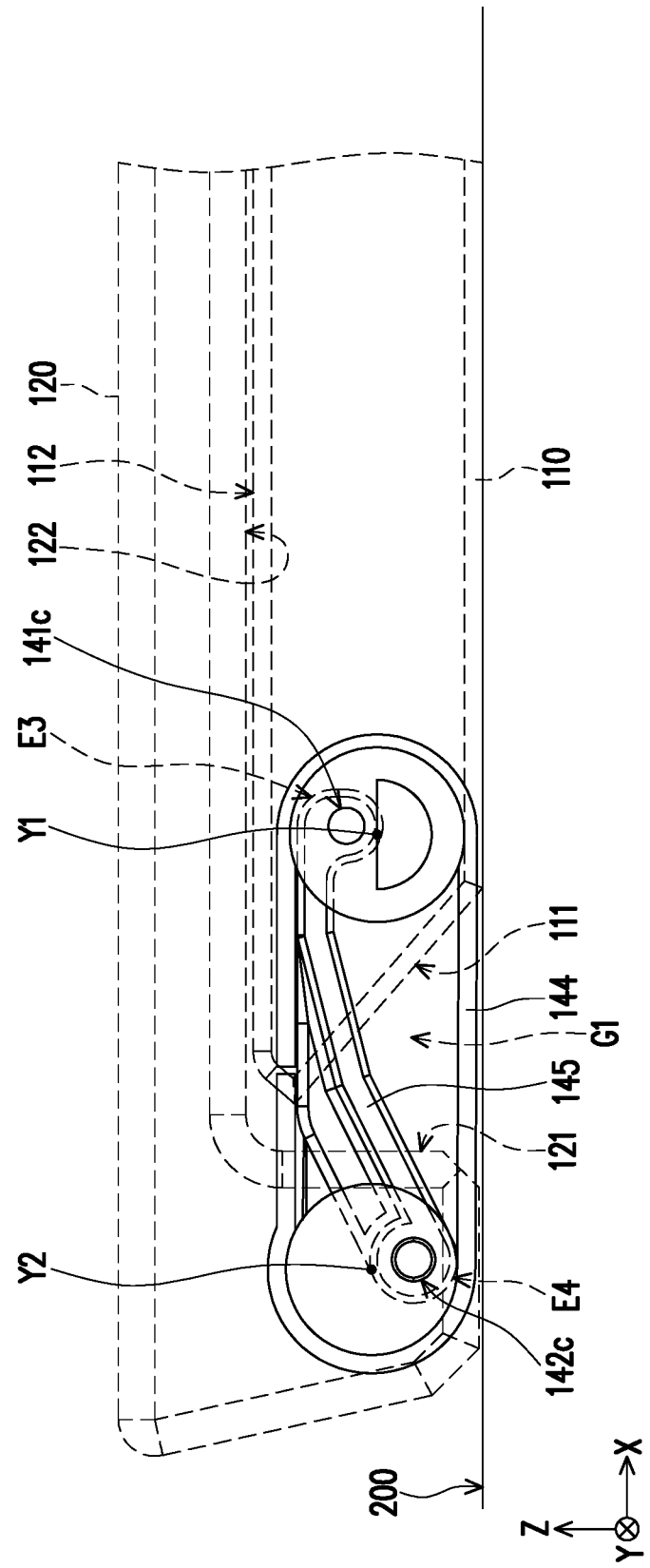
FIG. 4A and FIG. 4B respectively illustrate a side view of a portion of a portable electronic device at a hinge module.
Figure 4B:
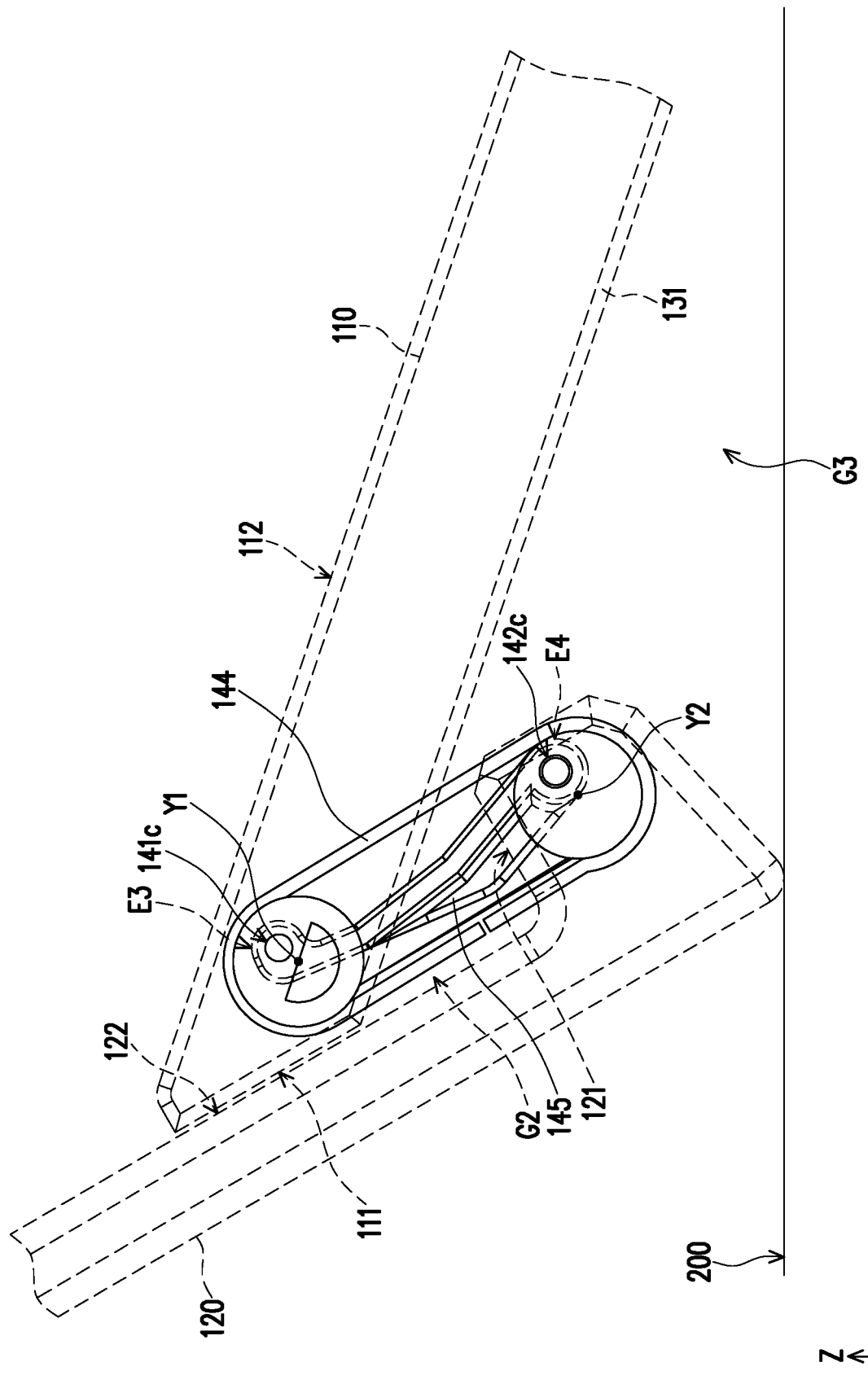

FIG. 4A and FIG. 4B respectively illustrate a side view of a portion of a portable electronic device at a hinge module. Please refer to FIG. 3C, FIG. 4A, and FIG. 4B at the same time. In the embodiment, FIG. 4A corresponds to FIG. 1A and FIG. 4B corresponds to FIG. 1B. In detail, as shown in FIG. 3C, the first rotating shaft 141 includes a first shaft portion 141a, a first head portion 141b, and an eccentric hole 141c located in the first head portion 141b. The second rotating shaft 142 includes a second shaft portion 142a, a second head portion 142b, and an eccentric hole 142c located in the second head portion 142b. The third end E3 and the fourth end E4 of the second linking rod 145 are pivotally connected to the eccentric holes 141c and 142c, respectively. In this way, when the first body 110 and the second body 120 rotate to be folded or unfolded relative to each other by the hinge module 140, other than causing the rotating movement of the first rotating shaft 141 and the second rotating shaft 142, the effect of the first body 110 and the second body 120 moving close to or away from each other may be produced due to the eccentric configuration of the second linking rod 145. Here, the first rotating shaft 141 has a rotating axis Y1 and the second rotating shaft 142 has a rotating axis Y2, which are labelled in FIG. 4A and FIG. 4B as exemplification of the first rotating shaft 141 and the second rotating shaft 142.

As shown in FIG. 4A, when the portable electronic device 100 is in the folded state, a surface 112 of the first body 110 faces and is substantially in contact with a surface 122 of the second body 120. At the hinge module 140, a surface 111 of the first body 110 faces a surface 121 of the second body 120 and a space G1 is maintained between the two. Therefore, the convex portion of the first body 110 having the surfaces 111 and 112 are substantially located in a L-shaped recess formed by the surfaces 121 and 122 of the second body 120.

Next, as shown in FIG. 4B, when the portable electronic device 100 is in the unfolded state, the second linking rod 145 of the hinge module 140 causes the aforementioned to move below the first body 110. The surface 121 of the second body 120 is changed to face the bottom surface of the first body 110, so as to form another space G2, thereby allowing the surface 111 of the first body 110 to abut the surface 122 of the second body 120, wherein the second body 120 of the embodiment has a display, that is, the surface 122 and the display surface of the display are substantially coplanar. In this way, the portable electronic device 100 allows the first body 110 and the second body 120 to move closer to each other by the hinge module 140, so as to reduce the gap between the bodies, thereby reducing the case where the display has an insufficient screen ratio in the vision of the user.

Further, as shown in FIG. 4B, when the portable electronic device 100 is in the expanded state, the first body 110 relies on a platform 200, the second body 120 is erected on the platform 200, and the antenna unit 131 protrudes from the bottom surface of the first body 110. As shown in FIG. 4A, when the portable electronic device 100 is in the closed state, the first body 110 relies on the platform 200, the second body 120 is superimposed on the first body 110, and the antenna unit 131 hides into the first body 110. Accordingly, by the driving process of the hinge module 140, the portable electronic device 100 not only completes the folding or unfolding actions of the body, but also drives the antenna module 130 to open and close relative to the body, so that the antenna module 130 is relatively away from the first body 110 when in the expanded state, so as to reduce the possibility of situations such as the body having a metal structure which shields the antenna module 130. In the process of transforming from FIG. 4A to FIG. 4B, by abutting the second body 120 against the platform 200, the bottom surface of the first body 110 produces an effect of being locally lifted relative to the platform 200, so as to create a space G3 between the bottom surface of the first body 110 and the platform 200 for accommodating the expanded antenna unit 131.

Figure 5:
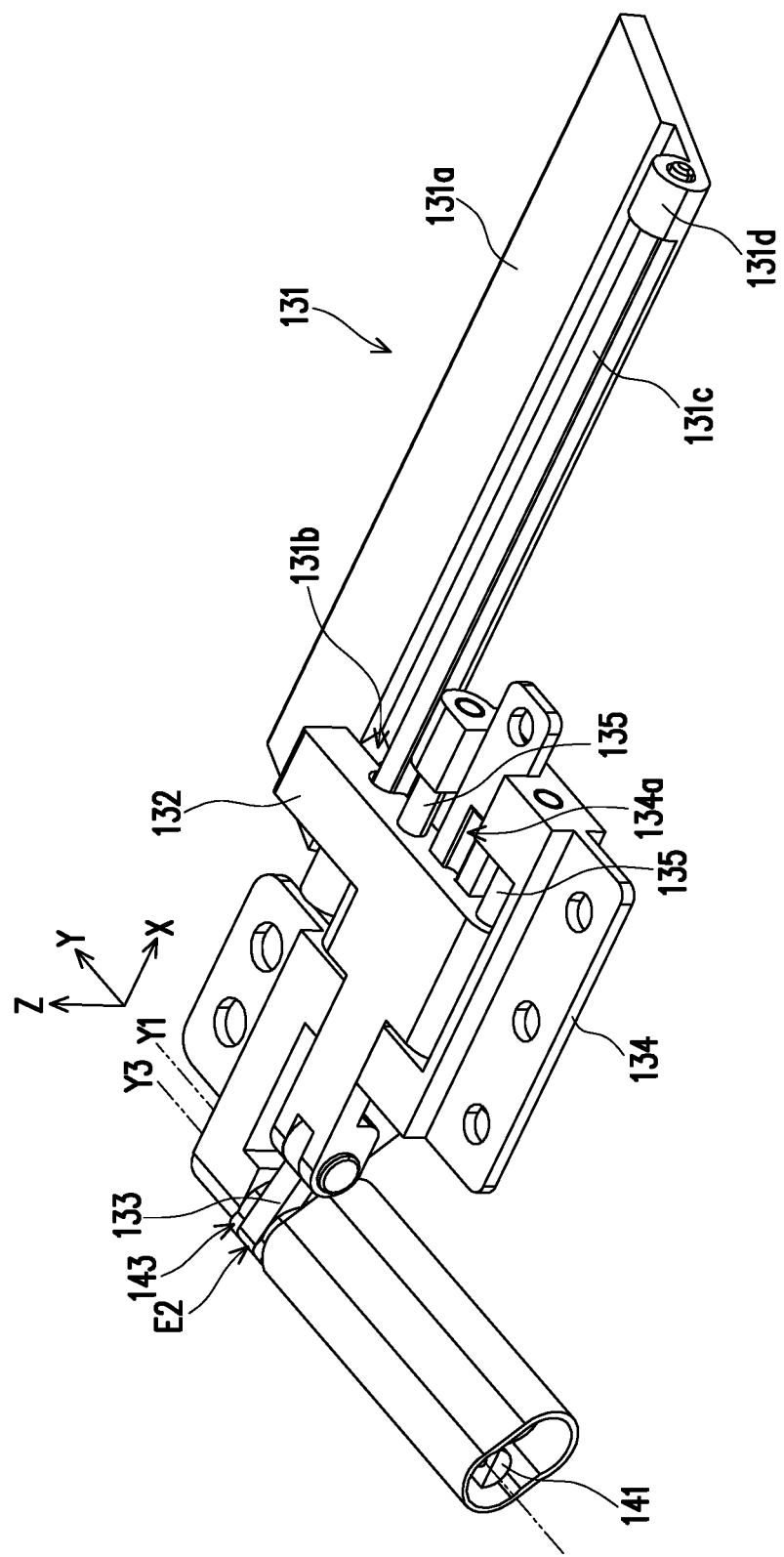
FIG. 5 is a schematic view of an assembly of a hinge module and an antenna module according to another embodiment of the disclosure.

FIG. 5 is a schematic view of an assembly of a hinge module and an antenna module according to another embodiment of the disclosure. The difference with the foregoing embodiment is that the hinge module of the present embodiment only has the first rotating shaft 141 to form a single-shaft rotation mechanism. As shown in FIG. 5, the first rotating shaft 141 has a rotating axis Y1, the pivoting portion of the first linking rod 133 and the first rotating shaft 141 has a pivoting axis Y3, and the rotating axis Y1 and the pivoting axis Y3 are both parallel to the Y-axis. However, the rotating axis Y1 and the pivoting axis Y3 are not located on the same axis (parallel but not coincident to each other). Accordingly, it can be clearly known from the present embodiment and the foregoing embodiment that the antenna unit 131 may have the effect of rotating to open and close as required under the premise that the first linking rod 133 is pivotally connected to the rotation mechanism and the pivoting axis of the first linking rod 133 is eccentric to the rotating axis of the rotation mechanism.

Figure 6:
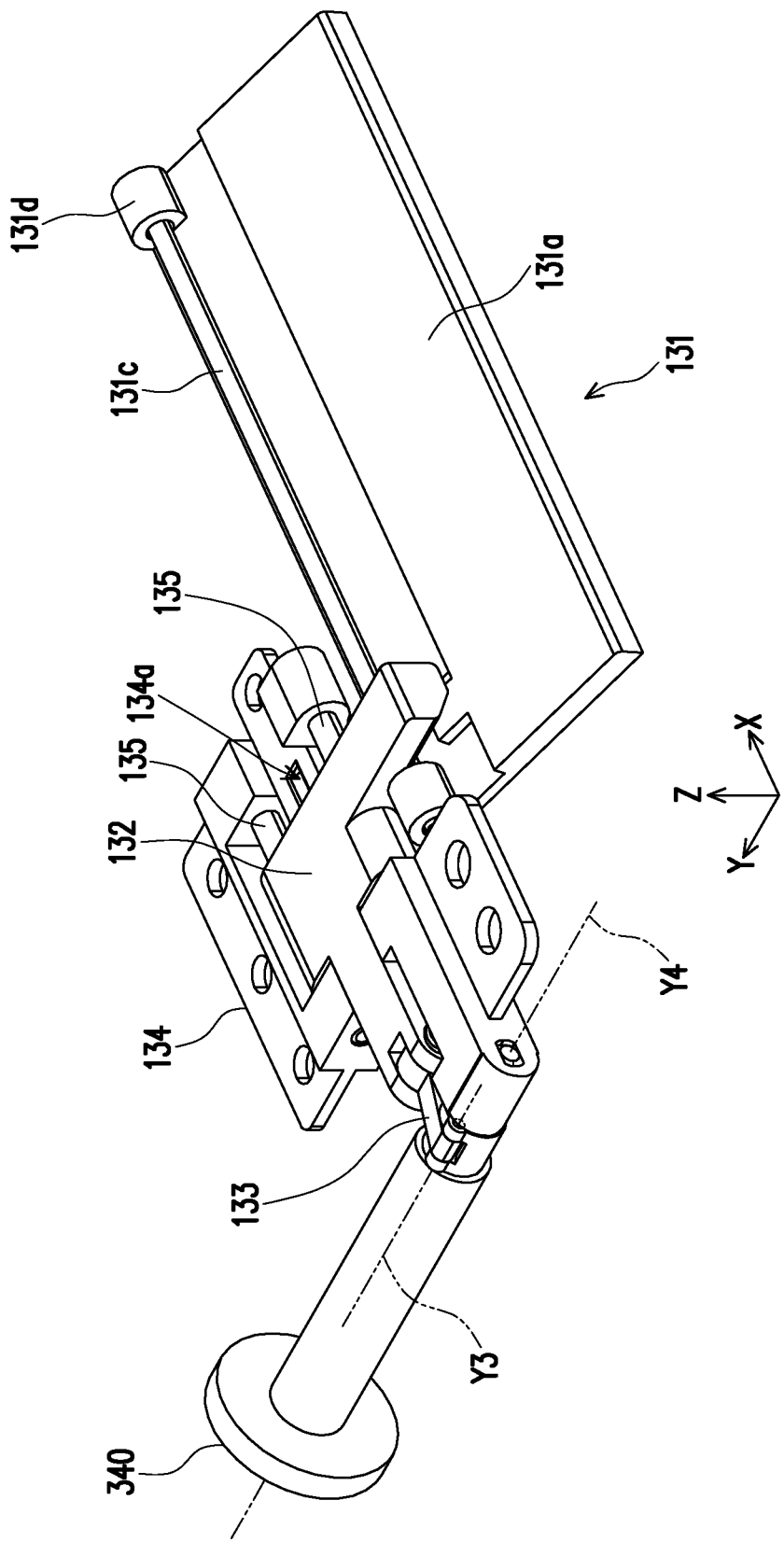
FIG. 6 is a schematic view of an antenna module according to another embodiment of the disclosure.

FIG. 6 is a schematic view of an antenna module according to another embodiment of the disclosure. Please refer to FIG. 6. A rotation mechanism 340 of the embodiment is, for example, a manual knob having a rotating axis Y4. The first linking rod is 133 is similar to the foregoing, which is pivotally connected to the rotation mechanism 340 and the pivoting axis Y3 is eccentric to the rotating axis Y4 of the rotation mechanism 340. Therefore, the embodiment allows the user to manually achieve the opening and closing effect of the antenna unit 131 same as the above embodiment and further allows the user to adjust the opening and closing angle of the antenna unit 131.

In summary, in the above embodiments of the disclosure, the portable electronic device allows the driving member and the linking rod of the antenna module to transmit the rotation action of the rotation mechanism to the antenna unit by rotatably disposing the antenna unit on the body together with the rotation mechanism, so that the antenna unit produces an effect of rotating to open and close relative to the body. Accordingly, the movable antenna module may correspondingly change along with the usage state of the portable electronic device, so that the antenna module may move away from the body when being expanded relative to the body.

In one of the embodiments, the rotation mechanism is the hinge module of the portable electronic device, which not only allows the body to open and close by the hinge model, but also allows the hinge module to drive the antenna unit to open and close relative to the body. Here, regardless of whether the hinge module is single-shaft or double-shaft, the hinge module can achieve the effect of opening and closing the antenna unit due to the eccentric configuration of the first linking rod and the sliding configuration of the driving member, wherein the double-shaft hinge module can also provide the bodies the effect of moving closer to or away from each other during the process of opening and closing. In addition to effectively reducing the screen ratio visually, the lifting effect caused by the body when moving closer also provides the antenna unit at the bottom the space required for expansion.

In one of the embodiments, the rotation mechanism may be a manual knob mechanism, which also causes the opening and closing effect of the antenna unit and allows the user to further adjust the opening and closing angle thereof.

It can be known from the above that the movable antenna unit allows the antenna module to not be restricted even if the body is disposed with a metal structure or a light and thin design. Relatively, the antenna module may also be stored in the body when not in use to maintain a thin and tidy appearance.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A portable electronic device, comprising:
   at least one body;
   an antenna module, comprising:
   an antenna unit rotatably disposed on the body;
   a driving member slidably disposed on the body and abutting the antenna unit, a portion of the antenna unit being blocked on a sliding path of the driving member to be pushed by the driving member, and the driving member sliding and rotating the antenna unit to rotate to be opened or closed relative to the body;
   a first linking rod having a first end and a second end opposite to each other, the first end pivotally connected to the driving member; and
   a rotation mechanism disposed on the body, the second end of the first linking rod being pivotally connected to the rotation mechanism and eccentric to a rotating axis of the rotation mechanism so as to drive the driving member to slide in a straight line path when the rotation mechanism rotates.

2. The portable electronic device according to claim 1, wherein the rotating axis is orthogonal to a sliding direction of the driving member, a pivoting axis of the first end and the driving member, a pivoting axis of the second end and the rotation mechanism, and the rotating axis are parallel to one other.

3. The portable electronic device according to claim 1, wherein the sliding path of the driving member comprises a first section and a second section, when sliding in the first section, the driving member does not drive the antenna unit to rotate relative to the body and the antenna unit remains hidden in the body; when sliding in the second section, the driving member drives the antenna unit to rotate relative to the body, and the antenna unit is turned inside out to be opened relative to the body.

4. The portable electronic device according to claim 3, wherein at least one of the antenna unit and the driving member has a convex portion located in the second section and blocks on the sliding path of the driving member, when the driving member moves in the second section, the driving member drives the antenna unit to be turned inside out relative to the body by the convex portion.

5. The portable electronic device according to claim 4, wherein the convex portion has a guiding surface following a direction of the sliding path to allow the driving member to slide back and forth along the sliding path.

6. The portable electronic device according to claim 4, wherein the antenna module further comprises a guiding rod disposed in the body, the guiding rod is parallel to the straight line path and penetrates the driving member, and the driving member is restricted by the guiding rod to slide in the straight line path only.

7. The portable electronic device according to claim 1, wherein the antenna module further comprises a shaft disposed on the body, and pivoting portions of the antenna unit are pivotally connected to the shaft, wherein the driving member has a groove movably coupled to the shaft, and the driving member slides along the shaft between the pivoting portions by a mating structure of the groove and the shaft.

8. The portable electronic device according to claim 1, wherein the portable electronic device comprises a first body and a second body, the rotation mechanism is a hinge module connected between the first body and the second body, and the first body and the second body rotate to be folded or unfolded relative to each other by the hinge module.

9. The portable electronic device according to claim 8, wherein when the portable electronic device is in an unfolded state, the first body relies on a platform, the second body stands on the platform, and the antenna unit is turned inside out of a bottom surface of the first body, when the portable electronic device is in a folded state, the first body relies on the platform, the second body is overlapped on the first body, and the antenna unit hides into the first body.

10. The portable electronic device according to claim 9, wherein when the portable electronic device is in the unfolded state, the second body abuts the platform and the bottom surface of the first body is locally lifted.

11. The portable electronic device according to claim 8, wherein the hinge module comprises:
    a first rotating shaft connected to the first body;
    a second rotating shaft connected to the second body; and a second linking rod having a third end and a fourth end opposite to each other, wherein the third end is pivotally connected to the first rotating shaft and eccentric to a rotating axis of the first rotating shaft, and the fourth end is pivotally connected to the second rotating shaft and eccentric to a rotating axis of the second rotating shaft.

12. The portable electronic device according to claim 11, wherein the rotating axis of the first rotating shaft is parallel to the rotating axis of the second rotating shaft.

13. The portable electronic device according to claim 3, wherein the driving member and the antenna unit have wedge-shaped convex portions respectively, the wedge-shaped convex portion of the antenna unit is located on a the straight line path of the wedge-shaped convex portion of the driving member the wedge-shaped convex portions are overlapped with each other when the driving mermber slides in the second section, and the wedge-shaped convex portions are not overlapped with each other when the driving member slides in the first section and on a surface of the antenna unit.

14. The portable electronic device according to claim 1, wherein the rotation mechanism has a shaft body having the rotating axis, the first linking rod is pivoted to the shaft body via the second end eccentric to the rotating axis, and the first linking rod is rotated relative to the shaft body.

* * * * *